UNITED STATES PATENT OFFICE.

HARRY P. WILLIS, OF WATERFORD, NEW YORK, ASSIGNOR TO WILLITE ROAD CONSTRUCTION COMPANY OF AMERICA, A CORPORATION OF MAINE.

PLASTIC COMPOSITION.

1,190,615.  Specification of Letters Patent.  Patented July 11, 1916.

No Drawing.  Application filed December 7, 1914. Serial No. 875,767.

*To all whom it may concern:*

Be it known that I, HARRY P. WILLIS, a citizen of the United States of America, and a resident of Waterford, in the county of Saratoga and State of New York, have invented a certain new and useful Plastic Composition, of which the following is a specification.

This invention has for its object to provide an improved composition for use in pavements, paving blocks, sidewalks, stable floors, railroad ties, reservoir linings, drain pipes, building blocks, and other substantial articles exposed to the effects of heat, cold and moisture.

The composition comprises a finely-divided filler composed of any soil, earth matter or mixture thereof, a mineral asphaltic binder and a salt having the tempering or hardening characteristics of sulfate of copper when combined with the other ingredients of the composition.

An important advantage of the invention is in the use of a filler which can be very easily and cheaply obtained, as I contemplate the use of any soil found at the place where the composition is to be made and used, or such material and sand, disintegrated stone, clay or similar material as may be obtainable at or near the place where the pavement or other structure is to be placed. In the case of a road being converted into a pavement the old road bed may form all or a large part of the filler. This filler is finely-divided to a degree such as to facilitate its incorporation with the binder but not necessarily to the degree of pulverization.

For the binder I use a mineral asphaltic material. With the binder I mix a small percentage of a salt such as sulfate of copper. This sets the binder and hardens it so as to make it practically as hard as cement concrete. It is the use of this salt, which permeates the entire composition, which makes it practicable to use the cheap filler. The whole mass becomes a chemical composition, having certain characteristics which, in contradistinction to all pavements of bituminous character known to me, prevents its flow in hot exposures, its cracking in cold exposures and its material absorption of water in moist exposures. The scientific explanation of these attained results appears unnecessary to detail, it being evident that, to have the characteristics referred to, the composition must harmonize, in its expansion and contraction, with temperature changes.

As a specific example of the use of my improved composition, there is taken for the foundation or base of a pavement a mixture of eighty to ninety per cent. of finely-divided soil filler heated to about 240° F. To this is added from ten to twenty per cent. of mineral asphaltic binder also heated to about 240° F., the percentage of the binder depending on the character of the filler and the quantity of the binder which the filler, heated to about the same degree, will absorb. This is about eleven per cent. in the case of sand with little or no admixture of clay, for instance. Sulfate of copper, from one-quarter of one per cent. to one per cent., approximately, is added to the binder during the heating of it. Preferably the material for the filler is finely-broken or divided and heated in a partial vacuum and is also mixed in a partial vacuum with the binder which has been previously heated and mixed with the sulfate of copper. By this process the binder permeates the filler thoroughly and to a degree far beyond that possible if the mixing were carried out at atmospheric pressure, and this thorough permeation permits the use of a larger proportion of the filler than would be possible otherwise. The mixing in a partial vacuum also insures that the product will be free from air, or materially denser and more free from air than would otherwise be the case, thus increasing the adhesion of the ingredients and the strength of the product. For the wearing course of a pavement approximately the same materials, percentages and method of mixing may be used, but a different asphaltic material may be substituted to attain a different finish.

Though I have described with detail a specific use, composition and method embodying my invention, yet it is to be understood that the invention is not restricted to this particular use, percentage or method. Various modification thereof and additions thereto by those skilled in the art, with the purpose of producing a variety of mechanical and ornamental finishes, through the addition of elements not affecting the chemical action of the elements of the composition to which I lay claim, may be made without departing from the spirit of my invention.

There are several advantages associated with my invention among them being the use of a universally cheap filler to the extent of 85 per cent. of the total, the use of a filler which is almost always immediately at hand, and the consequent production of a pavement or other substantial article at a greatly reduced expense, and a character which closely approximates perfection in lasting qualities and non-injury by temperature and climatic changes.

While it may be claimed that one or more of the ingredients mentioned have at some time and in some way been used in the art, yet I am not aware that all of them have been used, either in the manner or in the proportions described and claimed, and especially for such substantial articles as those contemplated by me, which, unlike paints and roofing coatings, must stand up against rough and constant physical contact with other substantial bodies.

Having thus described my invention what I claim as new therein and desire to secure by Letters Patent is:

1. A plastic composition comprising a finely-divided filler, a mineral asphaltic binder, and sulfate of copper.

2. A plastic composition comprising eighty to ninety per cent. of finely-divided filler, ten to twenty per cent. of mineral asphaltic binder, and a small percentage of sulfate of copper.

3. A plastic composition comprising a finely-divided soil filler, a mineral asphaltic binder, and sulfate of copper.

4. A plastic composition comprising a finely-divided earthy filler, a mineral asphaltic binder, and sulfate of copper.

5. A plastic composition comprising a finely-divided filler, a mineral asphaltic binder, and sulfate of copper; all of the ingredients being intimately mixed in a highly heated condition.

6. A plastic composition comprising a finely-divided filler, a mineral asphaltic binder, and sulfate of copper; all of the ingredients being intimately mixed and the mixture being so dense as to be practically free from air.

7. A plastic composition comprising a finely-divided filler and a mineral asphaltic binder impregnated with sulfate of copper.

In witness whereof, I have hereunto signed my name in the presence of two subscribing witnesses.

HARRY P. WILLIS.

Witnesses:
D. ANTHONY USINA,
LULU STUBENVOLL.